US005242638A

United States Patent [19]

Shibachi et al.

[11] Patent Number: 5,242,638

[45] Date of Patent: Sep. 7, 1993

[54] MANUFACTURING METHOD FOR POTTERY PROVIDED WITH FLOWING PATTERNS OR SPREADING PATTERNS

[75] Inventors: Tomoaki Shibachi; Mitsuo Morishita, both of Tokoname, Japan

[73] Assignee: INAX Corporation, Tokoname, Japan

[21] Appl. No.: 801,397

[22] Filed: Dec. 2, 1991

[30] Foreign Application Priority Data

Nov. 30, 1990 [JP] Japan .................................. 2-338939
May 29, 1991 [JP] Japan .................................. 3-228147
May 29, 1991 [JP] Japan .................................. 3-228148

[51] Int. Cl.$^5$ ........................ C04B 41/81; C04B 41/86

[52] U.S. Cl. .......................................... 264/62; 264/60; 264/245; 427/147

[58] Field of Search ........................... 264/62, 245, 60; 427/147

[56] References Cited

U.S. PATENT DOCUMENTS 521,226 6/1894 Van Den Berghen ............. 264/245
4,294,635 10/1981 Hurley ................................. 264/60

FOREIGN PATENT DOCUMENTS 45-6147 3/1970 Japan .................................... 264/62
62-33606 2/1987 Japan .
62-174108 7/1987 Japan .
62-178305 8/1987 Japan .
62-182176 8/1987 Japan .
62-182177 8/1987 Japan .
62-270303 11/1987 Japan .
62-292687 12/1987 Japan .
63-22609 1/1988 Japan .
63-188004 8/1988 Japan .
63-209804 8/1988 Japan .
64-52688 2/1989 Japan .
64-69578 3/1989 Japan .
1-247109 10/1989 Japan .
1-297212 11/1989 Japan .
391346 of 1888 United Kingdom ................ 427/147
8049 of 1908 United Kingdom ................ 427/147

*Primary Examiner*—James Derrington
*Attorney, Agent, or Firm*—Sterne, Kessler, Goldstein & Fox

[57] ABSTRACT

A manufacturing method for potteries which mixes decorative raw material liquids within a container or on a flat surface to produce natural and dreamy stripe-patterns or scroll-patterns. Such patterns are transferred to a sheet material having water absorptivity for transferring to a molded article prior to baking. When the mold is baked, the natural and dreamy stripe-patterns or scroll-patterns are applied onto the resulting pottery. The patterns produced by this method are free from creation of pin holes, bubbles and relatively large recesses.

8 Claims, 6 Drawing Sheets

MANUFACTURING METHOD FOR POTTERY PROVIDED WITH FLOWING PATTERNS OR SPREADING PATTERNS

FIELD OF THE INVENTION

The present invention relates to a manufacturing method for pottery, which covers pottery in general, building material, such as a tile or a roof tile, sanitary wares, such as toilets or washbowls, and tablewares and ornaments and others, which provides flowing patterns on the surface similar to that appearing on marble or the like, or spreading patterns composed of a plurality of color regions.

BACKGROUND OF THE INVENTION

Conventionally, in order to manufacture pottery which looked like a marble product, a process of glazing, by dripping on a molded article prior to baking, is repeated respectively to many kinds of glaze different in color development, and then the molded article is baked.

During the step of baking, the molded article is laminated with a plurality of layers of glaze different in coloring. When each layer of glaze begins to melt, the layers of glaze react with each other at a certain part and the colors fuse, while single coloring of each layer of glaze appears at other parts, and flowing patterns of mixed plural colors are formed which look like a marble product.

SUMMARY OF THE INVENTION

The above-mentioned conventional manufacturing method is defective in the following points. Since the glaze contains previously dissolved gases, the gases are ejected by baking and are apt to cause pin holes or bubbles on the surface of patterns of the pottery. Since the glazes are dripped on the molded article many times, air is often trapped between the respective glaze layers, and a relatively large recess may be created on the pattern surface of the pottery after baking. For preventing such a defect, the thickness of applied glaze must be increased to a certain extent. Therefore, the glazing work is troublesome and its required time increases. Also, the colored layers of glaze are apt to flow in one direction during the baking, whereby the marble patterns are less in variation.

The present invention has been designed in light of the above-mentioned circumstances.

An object of the present invention is to provide a manufacturing method for pottery with flowing or spreading patterns which can prevent generation of pin holes, bubbles and relatively larger recesses, resulting in many varied patterns and not limited to marble patterns.

DESCRIPTION OF THE PREFERRED EMBODIMENT

Figure 1:
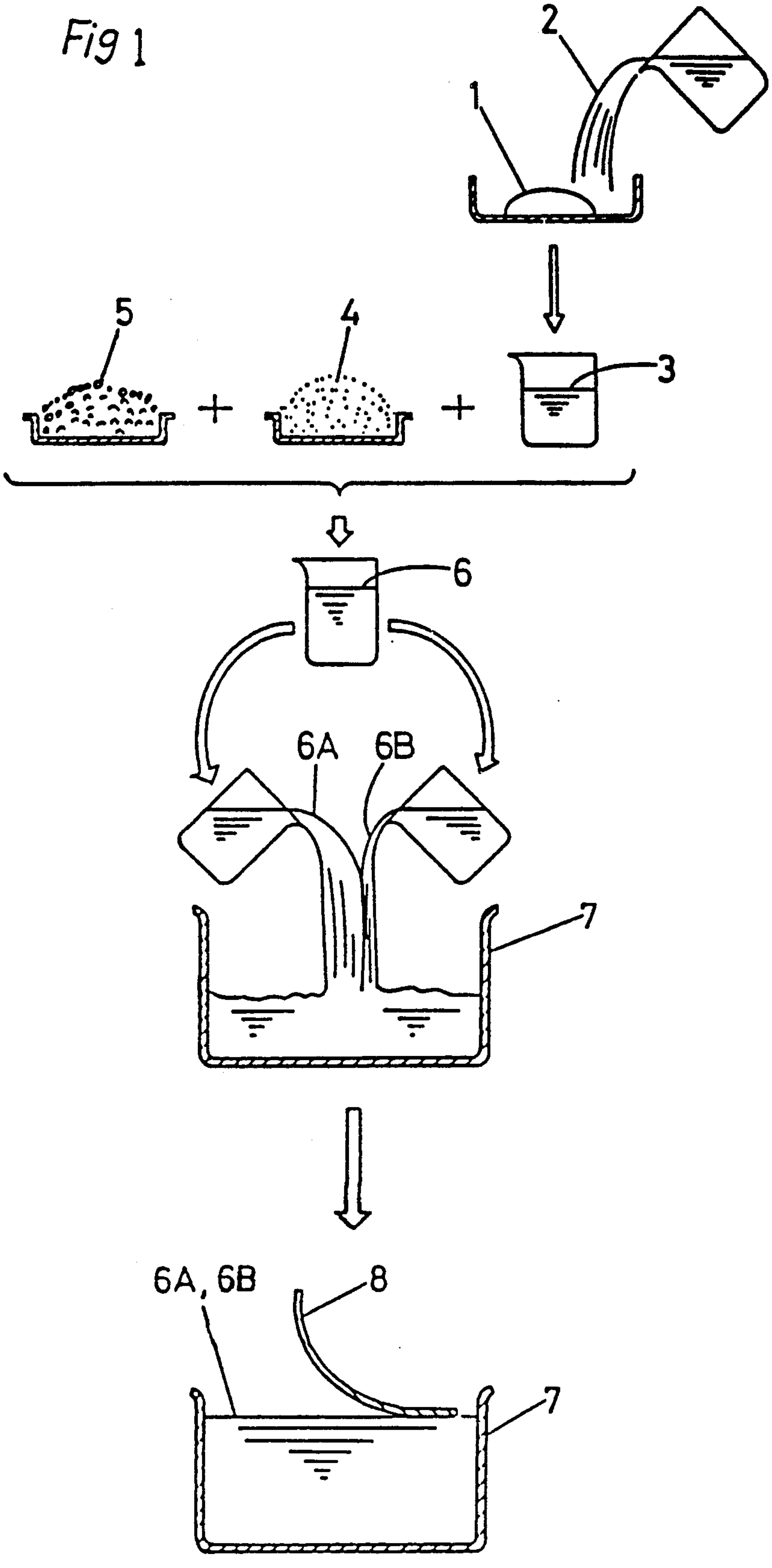
FIG. 1 is a flow chart depicting a process to obtain sheet material to produce flowing patterns.

Next, an embodiment of the present invention will be described in accordance with the drawings as follows:

FIG. 1 is a flow chart depicting the process of the present invention. At first, as shown at the uppermost portion in FIG. 1, starch paste 1 or the like is dissolved with water 2 to prepare binder liquid 3. Pigment 4 having proper coloring and the binder liquid 3, prepared as above-mentioned, are mixed with molding material clay 5 of the same quality as that used when the pottery is molded, thereby manufacturing decorative raw material liquid 6.

The decorative raw material liquid 6 must be kept in a slurry of viscosity of about 2000 centipoise. However, when the viscosity is too low, insufficient holding of liquid 6 is generated when stuck to a sheet material 8 to be discussed below. Conversely, when the viscosity is too high, there is a fear that the liquid 6 cannot be held. Also, for the decorative raw material liquid 6, many kinds of liquids (6A and 6B) are prepared with many pigments 4 different in coloring.

Next, the decorative raw material liquids (6A and 6B) different in coloring each are poured in varying amount into a container 7. After pouring, the container 7 is rotated or vibrated so that the decorative raw material liquids 6A and 6B in the container 7 are directly lightly agitated. Compressed air is then blown onto the liquid surface, thereby mixing the liquids, up to the point where each sole color still remains.

For example, now it is assumed that a large quantity of white liquid is used as the decorative raw material liquid 6A and a little red liquid is used as 6B. In this case, it is not a problem that both colors are mixed to form a pink region at a part within the container 7, but, when the whole region therein is dyed pink, patterns cannot be obtained. Therefore, in the container 7, residual regions of white and red (or either one) are required on the liquid surface. The result is red and pink stripe-patterns and scroll-patterns formed in a white background, or white and red stripe-patterns and scroll-patterns.

After completion of this work, a sheet material 8 of woven fabric, non-woven fabrics, paper or the like, and having water absorptivity, is slowly brought into contact with the liquid surface within the container 7. In fact, the sheet material 8 need only be floated on the liquid surface. Hence, the decorative raw material liquids 6A and 6B, in a mixed pattern on the liquid surface, are attracted to and held by the sheet material 8 in the same mixed pattern. A thickness of about 1 mm of the decorative raw material liquids 6A and 6B is enough to be stuck onto the surface of sheet material 8, and at this time the sheet material 8 is taken out from the container 7.

Figure 3:
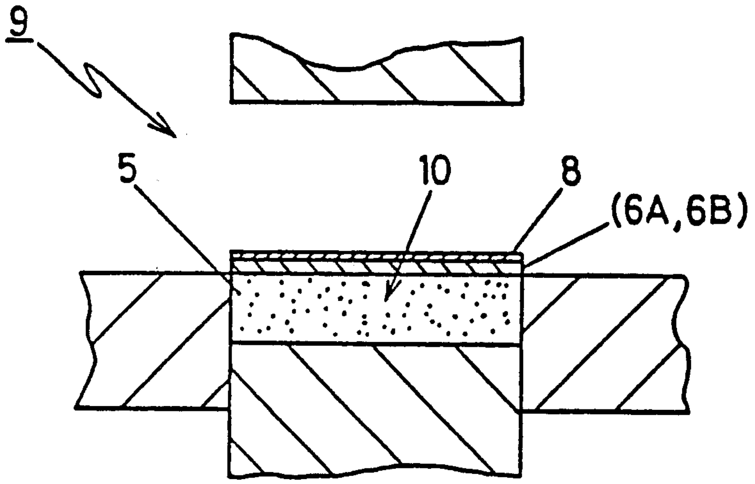
FIG. 3 is a sectional view of stretching sheet material 8 onto a mold by use of a dry press device.

Next, explanation will be given on patterning by a dry press device 9, as shown in FIG. 3.

In a case where the sheet material 8 is pressed onto the surface of a molded tile by the dry press device 9, a thickness of about 1 mm of the decorative raw material liquids 6A and 6B is enough to be stuck onto the surface of sheet material 8, and at this time the sheet material 8 is taken out from the container 7 and dried. The drying condition to be met is the percentage of water content, normally about 4%, required for the molding material clay 5 for tile molding.

After the decorative raw material liquid on the sheet material 8 dries, the sheet material 8 together with the molding material clay 5 is filled into a molding recess 10 of the dry press device 9, as shown in FIG. 3. Both the sheet material 8 and clay 5 can be positioned as either the upper or the lower layer in the molding recess 10, but it is preferable to position the sheet material 8 as the upper layer from the viewpoint of workability.

The decorative raw material liquid stuck on the sheet material 8 is in surface contact with the molding clay 5. The materials are all then pressed in that condition to form the raw tile base which is then baked. The sheet material 8, stuck onto the raw tile base at the side of the pattern surface layer, may be peeled off before baking or burnt off by baking.

Figure 4:
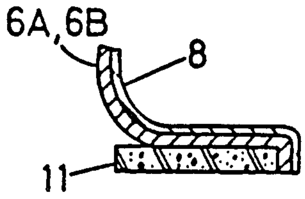
FIG. 4 is a sectional view showing the sheet material 8 stuck to the mold.

Next, explanation will be given of an embodiment where the sheet material 8 is stuck onto a molded article 11 as shown in FIG. 4.

Where the sheet material 8 is stuck onto a molded article 11, immediately before the decorative raw material liquids 6A and 6B held to the sheet material 8 are properly dried, the sheet material 8 is stuck in a manner of extending along the surface contours of molded pottery 11 prior to baking. For example, in this embodiment, the sheet material 8 can be stretched in such a manner that it comes into close contact with all four top and side surfaces of molded article 11. In addition, when the sheet material 8 permeated with the decorative raw material liquids 6A and 6B is dried, it is preferable that it is dried to the same percentage of water content, normally about 4%, required for the molded article 11 itself.

The molded article 11 is then baked based on the baking conditions (method, temperature, time or the like) corresponding to the thickness, configuration, and raw material of the article. When the molded article 11, on which the sheet material 8 is stuck, is baked, the sheet material 8 is burnt off by baking, so that the baked pottery is not adversely affected by the sheet material 8.

Alternatively, the sheet material 8 can be peeled off from the molded article 11 prior to its baking. In other words, the decorative raw material liquids 6A and 6B held by the sheet material 8 gradually permeate into the molded article 11 so that all the liquids, after a while, are held by the article. Accordingly, at this time the sheet material 8 can be peeled off by itself.

The molded article 11, from which the sheet material 8 has been peeled off, can be baked as it is, but can also be baked after colorless transparent or colored transparent glaze is applied thereon.

Figure 5:
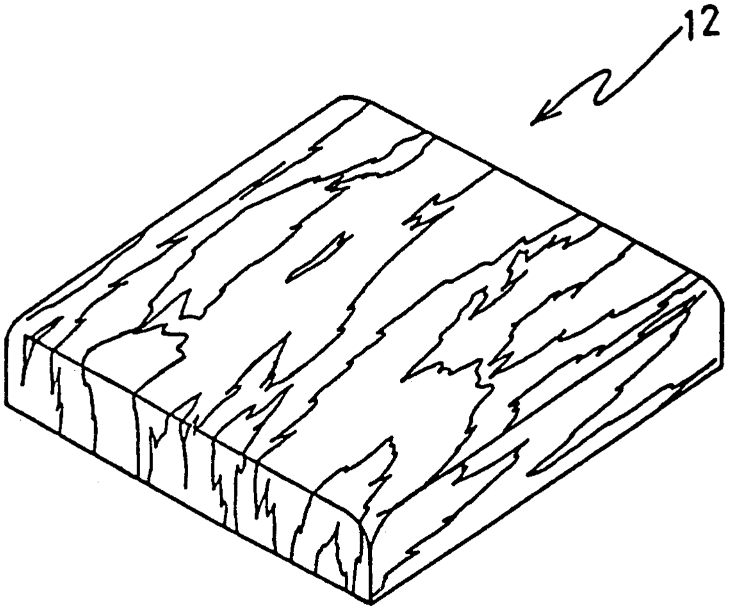
FIG. 5 is a perspective view of pottery made by sticking the sheet material provided with flowing patterns onto the mold.

Thus, as shown in FIG. 5, the flowing patterns which result after the pottery 12 has been baked, have depth and polish, thereby being more beautiful. Pottery 12, with the flowing patterns as shown in FIG. 5, has on its entire surface natural and dreamly flowing patterns.

Figure 6:
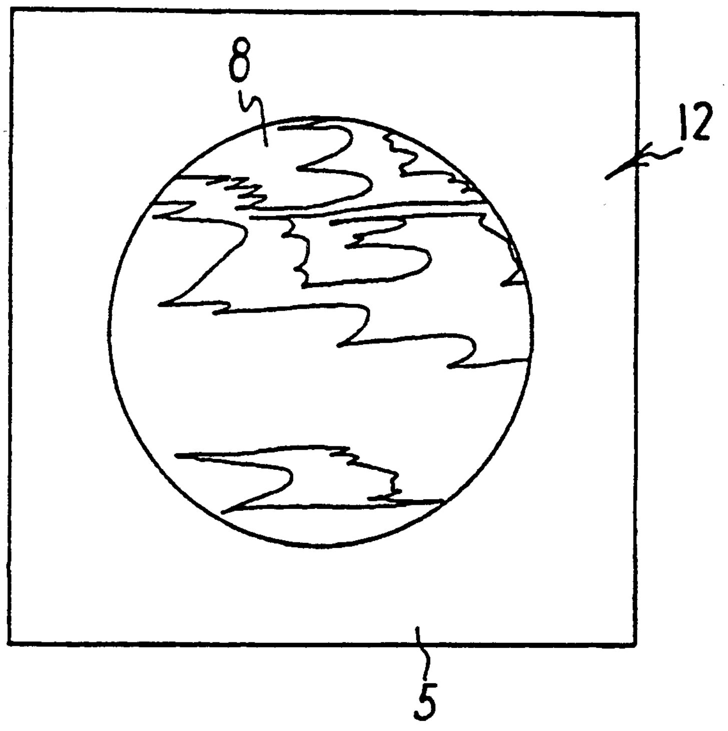
FIG. 6 is a perspective view of pottery decorative in an inlaying manner, on which the sheet material 8 with spreading patterns is stuck.

Next, explanation will be given on the embodiment in FIG. 6.

The sheet material 8 can be made smaller in outline than the plane of the resulting decorative tile 12, and the outer configuration of the outline can take on any shape, such as, round or starlike. In this case, a portion of the tile molding material clay 5 is covered with sheet material 8 and pressed so that, as shown in FIG. 6, the decorative tile 12 as a whole contains a patterned inlay. In addition, in such embodiment, not only the outer configuration of sheet material 8 is modified, but also a proper masking is required as opposed to the larger sheet material 8 described above, thereby only a region of clay 5 is attracted to the selected decorative raw material liquids. Thus, construction details of the method of the present invention can be varied to correspond to the mode of execution selected.

Next, explanation will be given of the embodiment where the decorative raw material liquid 6 is expanded on a flat surface 17 so as to obtain a sheet material 8 with spreading patterns.

Figure 2:
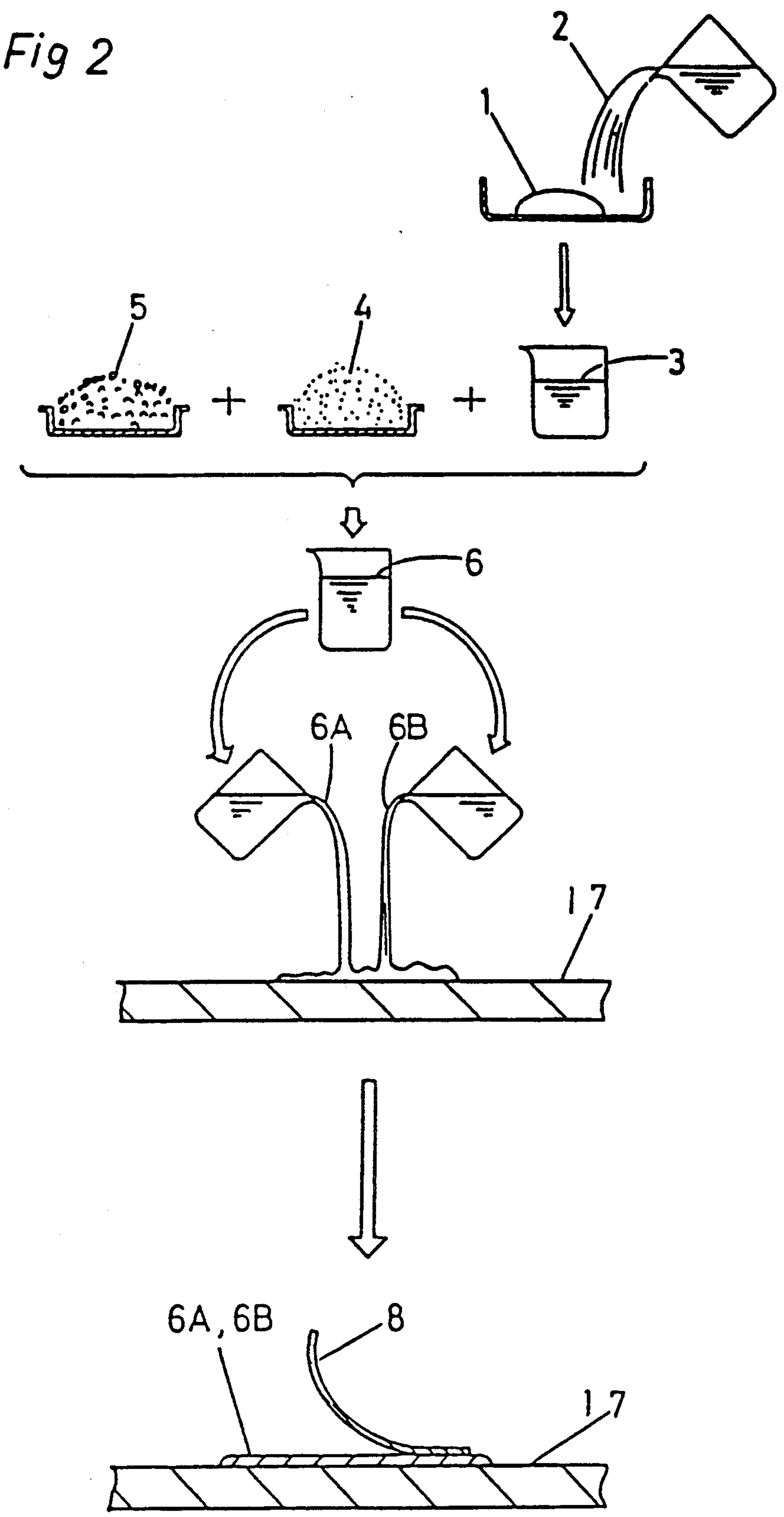
FIG. 2 is a flow chart depicting a process to obtain sheet material to produce spreading patterns.

FIG. 2 is a flow chart depicting the process of the present invention for the method to obtain spreading patterns. At first, starch paste 1 is dissolved with water 2 to prepare a binder liquid 3. Pigment 4 having proper coloring and the binder liquid 3, prepared as above-mentioned, are mixed with molding material clay 5 of the same quality as that used for forming molded pottery, thereby manufacturing decorative raw material liquid 6.

The decorative raw material liquid 6 should be kept in a slurry of viscosity of about 2000 centipoise. Also, for the decorative raw material liquid 6, many kinds of decorative raw material liquids 6A and 6B are prepared with many pigments different in coloring.

Next, on the proper flat surface 17, such as a desk surface or a pallet surface for coloring, the decorative raw material liquids 6A and 6B of colors (at least two colors), produced as above-mentioned, are flowed in varying amount. The flat surface 17 itself is vibrated, so that the decorative raw material liquids 6A and 6B are directly gently agitated, or compressed air is blown on the liquid surface, thereby mixing the liquids, up to the point where each sole color still remains.

For example, it is assumed that a large amount of white color is used as the decorative raw material liquid 6A and a small amount of red color is used as 6B. In this case, it is no problem if both colors are mixed to form pink regions, but if the whole region is dyed in pink, patterns cannot be formed. In other words, it is required that on the liquid surface, regions of white and red colors (or either one) remain. Accordingly, on the liquid surface, red and pink stripe-patterns or scroll-patterns are formed on a white background, or white and red stripe-patterns or scroll-patterns are formed on a pink background.

After completion of the above work, the sheet material 8 of woven fabric, nonwoven fabric, paper or the like, having water absorptivity, is brought into contact with the liquid surface on the flat surface 17 and firmly spread across the liquid surface.

Hence, the decorative raw material liquids are directly attracted and held onto the sheet material 8, and the colors appear as squashed or spread as a whole.

Upon confirming that a thickness of about 1 mm of the decorative raw material liquids 6A and 6B is stuck onto the surface of sheet material 8, the sheet material 8 is lifted from the flat surface 17, and the decorative raw material liquids 6A and 6B held onto the sheet material 8 must then be properly dried. The degree of drying of the decorative raw material liquids is preferably the same as the percentage of water content, usually about 4%, required for drying the molded article onto which sheet 8 is applied.

Next, as shown in FIG. 3, the above-mentioned sheet material 8, together with the molding material clay 5 for molding, is placed into the molding recess 10 of a dry press device 9 for forming a molded article. Both sheet material 8 and molding material clay 5 can be positioned as the upper layer or the lower layer in recess 10. The mold is pressed to obtain the raw tile base which is then baked on the basis of baking conditions corresponding to its thickness, configuration and raw material.

Figure 7:
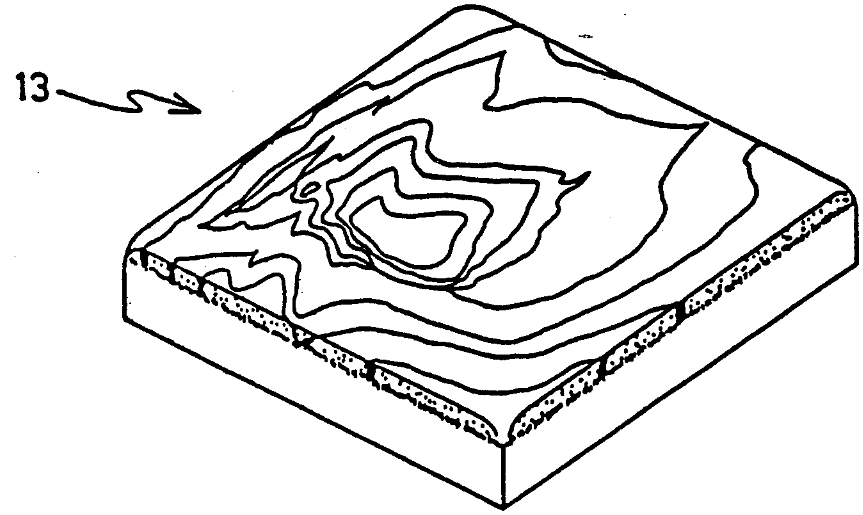
FIG. 7 is a perspective view of pottery on which the sheet material 8 provided with spreading patterns is stretched by the dry press.

As shown in FIG. 7, natural and dreamy spreading patterns appear on the upper surface of pottery 13 after baking.

Figure 8:
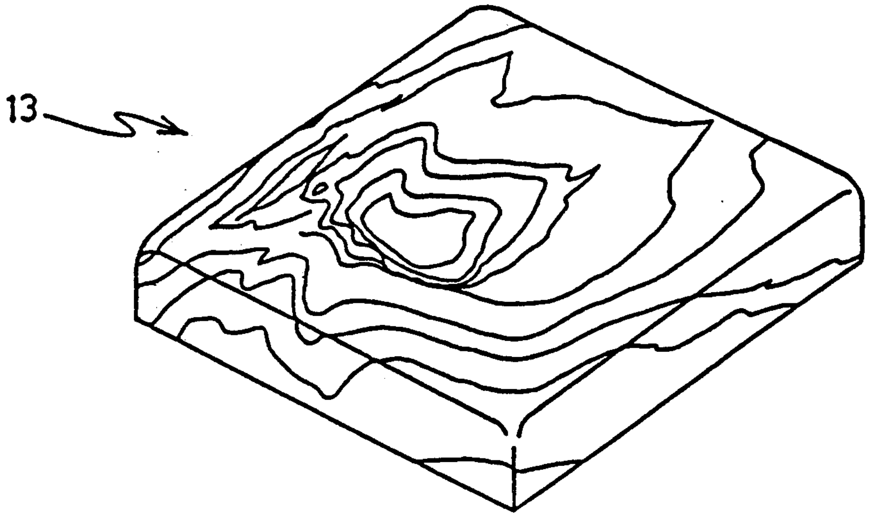
FIG. 8 is a perspective view of pottery on which the sheet material 8 provided with spreading pattern is stuck.

As shown in FIG. 8, before baking the molded article, it is possible that the sheet material onto which the decorative raw material liquids have already been attracted, can be stretched and stuck along the surface contours of the molded article. Where the molded article is a flat plate-like tile as shown, the sheet material can be stuck in close contact with the top and four side surfaces of the tile mold. Accordingly, when the tile is baked, the top and four side surfaces of the tile have the natural and dreamy spreading patterns.

As seen from the above, the pottery manufacturing method of the present invention results in pottery provided with the flowing patterns or spreading patterns without producing pin holes, bubbles or recesses. The patterns produced by coloring the decorative raw material liquids with different colors and pressing them are natural and dreamy stripe-patterns or scroll-patterns, thereby more closely resembling marble. Moreover, the patterns can be produced on pottery of complicated or rough configuration, with only the provision of the simple configuration of a flat plate material. Furthermore, since the selection of colors, the number of colors used, and the coloring conditions can be infinitely increased and varied, the present invention is advantageous in that the pattern variation of produced pottery can be infinitely expanded.

What is claimed is:

1. A method of manufacturing pottery, comprising the steps of:

providing two decorative raw material liquids wherein each of said decorative raw material liquids is prepared by mixing a molding material clay with a binder liquid and a pigment;

pouring two of said decorative raw material liquids into a container, wherein each of said decorative raw material liquids was produced from a different colored pigment;

mixing said decorative raw material liquids in said container;

stopping said mixing step before said decorative raw material liquids in said container are uniform in color;

placing a sheet in contact with the surface of said decorative raw material liquids in said container, wherein said sheet comprises material having water absorbtivity so that said decorative raw material liquids stick to said sheet;

drying said sheet containing said decorative raw material liquid;

placing said sheet containing said decorative raw material into a mold;

placing molding material clay into said mold in contact with said decorative raw material on said sheet;

pressing said sheet and said clay to form a molded article; and baking said molded article.

2. The method of claim 1, wherein said step of baking said molded article burns said sheet from said article.

3. The method of claim 1, further comprising the step of:

removing said sheet from said molded article prior to said baking step.

4. The method of claim 1, further comprising the step of:

applying a transparent glaze to said molded article prior to said baking step.

5. A method of manufacturing pottery, comprising the steps of:

providing two decorative raw material liquids wherein each of said decorative raw material liquids is prepared by mixing a molding material clay with a binder liquid and a pigment;

pouring two of said decorative raw material liquids onto a flat surface, wherein each of said decorative raw material liquids was produced from a different colored pigment;

mixing said decorative raw material liquids on said flat surface;

stopping said mixing step before said decorative raw material liquids on said flat surface are uniform in color;

placing a sheet in contact with the surface of said decorative raw material liquids, wherein said sheet comprises a material having water absorbtivity so that said decorative raw material liquids stick to said sheet;

spreading said sheet across said surface of said decorative raw material liquids;

drying said sheet containing said decorative raw material liquid;

placing said sheet containing said decorative raw material into a mold;

placing molding material clay into said mold in contact with said decorative raw material on said sheet;

pressing said sheet and said clay to form a molded article; and baking said molded article.

6. The method of claim 5, wherein said step of baking said molded article burns said sheet from said article.

7. The method of claim 5, further comprising the step of:

removing said sheet from said molded article prior to said baking step.

8. The method of claim 5, further comprising the step of:

applying a transparent glaze to said molded article prior to said baking step.

* * * * *